United States Patent
Elo et al.

(10) Patent No.: US 6,996,768 B1
(45) Date of Patent: Feb. 7, 2006

(54) ELECTRIC PUBLISHING SYSTEM AND METHOD OF OPERATION GENERATING WEB PAGES PERSONALIZED TO A USER'S OPTIMUM LEARNING MODE

(75) Inventors: Sara Elo, New York, NY (US); Jeffrey W. Milton, Saugerties, NY (US); Louis M. Weitzman, Brookline, MA (US)

(73) Assignee: International Business Machines Corporation, Armonk, NY (US)

(*) Notice: Subject to any disclaimer, the term of this patent is extended or adjusted under 35 U.S.C. 154(b) by 836 days.

(21) Appl. No.: 09/594,507

(22) Filed: Jun. 15, 2000

(51) Int. Cl.
*G06F 15/00* (2006.01)

(52) U.S. Cl. .................................. 715/500; 715/501.1

(58) Field of Classification Search .................. 715/513, 715/501.1, 500, 530, 789, 788; 345/788, 345/789
See application file for complete search history.

(56) References Cited

U.S. PATENT DOCUMENTS

| | | | |
|---|---|---|---|
| 5,621,875 A | | 4/1997 | Mason et al. |
| 5,797,001 A * | | 8/1998 | Augenbraun et al. ............ 707/9 |
| 5,860,073 A | | 1/1999 | Ferrel et al. |
| 5,899,975 A | | 5/1999 | Nielsen |
| 5,899,995 A * | | 5/1999 | Millier et al. ................ 707/102 |
| 5,937,398 A * | | 8/1999 | Maeda ........................ 706/32 |
| 5,937,418 A * | | 8/1999 | Ferris et al. ................. 715/513 |
| 6,023,714 A | | 2/2000 | Hill et al. |
| 6,044,376 A * | | 3/2000 | Kurtzman, II ............... 707/102 |
| 6,052,714 A * | | 4/2000 | Miike et al. ................. 709/217 |
| 6,067,536 A * | | 5/2000 | Maruyama et al. ............ 706/25 |
| 6,164,975 A * | | 12/2000 | Weingarden et al. ........ 434/322 |
| 6,177,940 B1 * | | 1/2001 | Bond et al. .................. 434/262 |
| 6,185,587 B1 * | | 2/2001 | Bernardo et al. ............ 715/513 |
| 6,199,082 B1 * | | 3/2001 | Ferrel et al. ................. 715/522 |
| 6,230,171 B1 * | | 5/2001 | Pacifici et al. .............. 715/512 |
| 6,253,216 B1 * | | 6/2001 | Sutcliffe et al. ............. 715/500 |
| 6,279,013 B1 * | | 8/2001 | LaMarca et al. ............ 715/500 |
| 6,301,661 B1 * | | 10/2001 | Shambroom ................. 713/168 |
| 6,327,574 B1 * | | 12/2001 | Kramer et al. ................ 705/14 |
| 6,327,590 B1 * | | 12/2001 | Chidlovskii et al. ........... 707/5 |
| 6,374,300 B2 * | | 4/2002 | Masters ...................... 709/229 |
| 6,389,400 B1 * | | 5/2002 | Bushey et al. ................. 705/7 |
| 6,408,437 B1 * | | 6/2002 | Hendricks et al. .......... 725/132 |
| 6,463,440 B1 * | | 10/2002 | Hind et al. .................. 707/102 |
| 6,494,376 B1 * | | 12/2002 | Davis et al. ............ 235/462.16 |
| 6,539,375 B2 * | | 3/2003 | Kawasaki ...................... 707/5 |
| 6,589,290 B1 * | | 7/2003 | Maxwell et al. ............ 715/507 |
| 6,589,291 B1 * | | 7/2003 | Boag et al. ................. 715/513 |

(Continued)

OTHER PUBLICATIONS

Business Editors, HomePage.com Provides Personalized Page Service to SportsPage.com, Business Wire Apr. 11, 2000, p. 1 ProQuest Search.*

(Continued)

*Primary Examiner*—Cong-Lac Huynh

(57) ABSTRACT

A personalized web page is generated by an Electronic Publishing System (EPS) based on predetermined profiles representative of the user's optimum mode of learning. The user's optimum mode of learning is based upon the Theory of Multiple Intelligences for seven (7) different modes of learning. An algorithm calculates user profiles based upon the learning theory. Alternatively, the user fills out a questionnaire provided by the system to determine the user's optimum mode of learning. The questionnaire elicits answers used to calculate the user's optimum mode of learning. An algorithm calculates the user's profile and encodes the profile as a vector of weights for the seven modes of learning. Document templates are created to define the structure of information to be presented to the user. When a user requests information, the user profile is obtained from the cookie or server and the information is presented to the user based on his/her profile which displays the information in the user's optimum learning mode.

11 Claims, 4 Drawing Sheets

U.S. PATENT DOCUMENTS

| | | | |
|---|---|---|---|
| 6,618,746 B2 * | 9/2003 | Desai et al. | 709/204 |
| 6,711,585 B1 * | 3/2004 | Copperman et al. | 707/104.1 |
| 6,721,275 B1 * | 4/2004 | Rodeheffer et al. | 370/238 |
| 6,732,331 B1 * | 5/2004 | Alexander | 715/513 |
| 6,755,783 B2 * | 6/2004 | Cosentino et al. | 600/300 |
| 6,817,980 B2 * | 11/2004 | Iliff | 600/300 |
| 2002/0049689 A1 * | 4/2002 | Venkatram | 706/45 |
| 2002/0107681 A1 * | 8/2002 | Goodkovsky | 703/22 |

OTHER PUBLICATIONS

Myaeng et al., Towards an Intelligent and Personalized Retrieval System, ACM Dec. 1986, pp. 121-129.*

Lieberman et al., Let's Browse: A Collaborative Web Browsing Agent, ACM 1999, pp. 65-68.*

"Frames of Mind: The Theory of Multiple Intelligence", Basic Books, 1983 (see pp. 1-5 from http://www.education-world.com/a_curr/curr054.shtml & http://www.igs.net/-cmorris/heg99.html pp. 1-3 "The Multiple Intelligences of Howard Earl Gardner").

Dr. Charles B. Sherer of Kent State Univ. (see pp. 1-3 of "MIDAS—About the Author" http://www.angelfire.com/oh/themidas/themidas4.html).

* cited by examiner

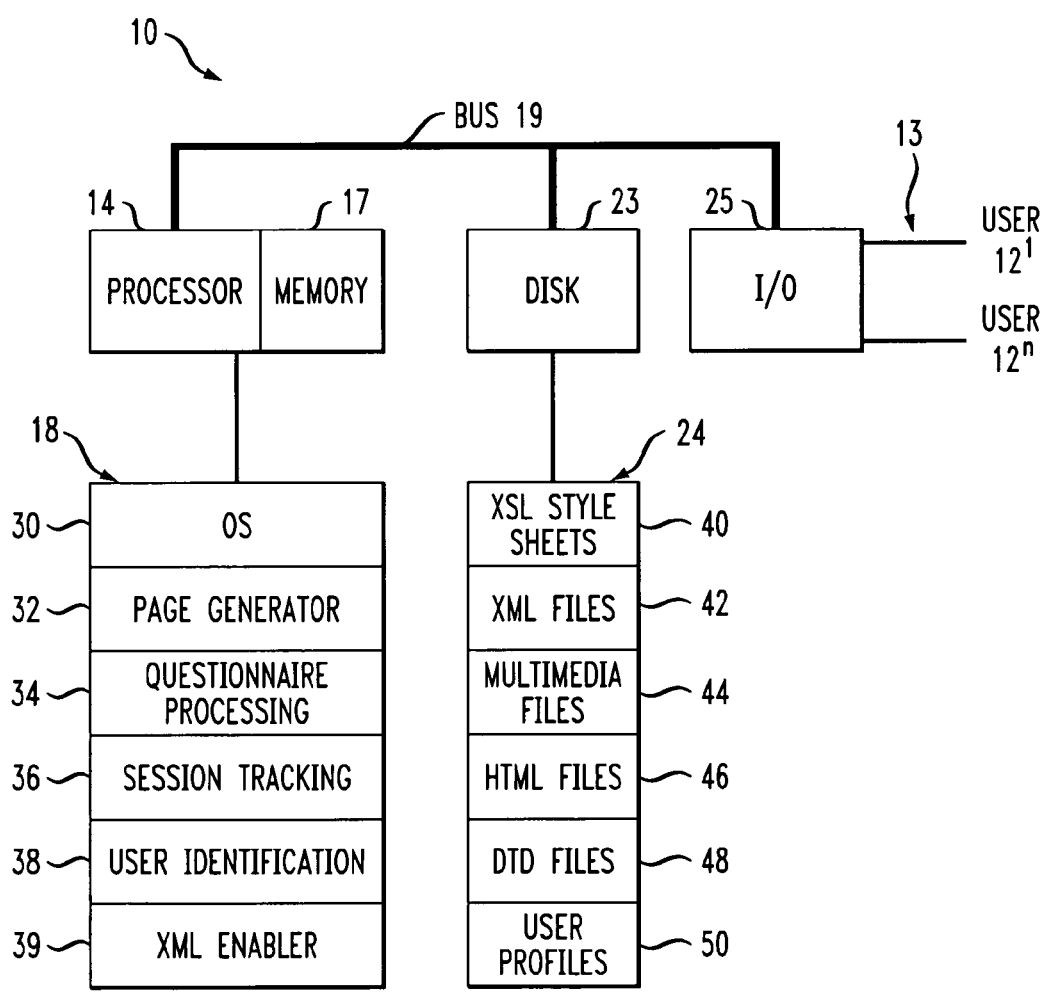

FIG. 2A

USER PROFILE

| COLUMN (1) | COLUMN (2) | COLUMN (3) |
|---|---|---|
| LEARNING MODE (LM) | DESCRIPTION | RATING (TOTALING 1.0) |
| 1. | VISUAL/SPATIAL | 0.20 |
| 2. | LOGICAL/MATHEMATICAL | 0.00 |
| 3. | LINGUISTIC/VERBAL | 0.05 |
| 4. | INTERPERSONAL | 0.50 |
| 5. | INTRAPERSONAL | 0.05 |
| 6. | KINESTHETIC/BODY | 0.20 |
| 7. | MUSICAL/RHYTHMIC | 0.00 |

FIG. 2B

USER PROFILE – USER SELECTION LM4

| COLUMN (1) | COLUMN (2) | COLUMN (3) |
|---|---|---|
| LEARNING MODE (LM) | DESCRIPTION | RATING (TOTALING 1.0) |
| 1. | VISUAL/SPATIAL | 0 |
| 2. | LOGICAL/MATHEMATICAL | 0 |
| 3. | LINGUISTIC/VERBAL | 0 |
| 4. | INTERPERSONAL | 1.0 |
| 5. | INTRAPERSONAL | 0 |
| 6. | KINESTHETIC/BODY | 0 |
| 7. | MUSICAL/RHYTHMIC | 0 |

FIG. 3

```
<!ENTITY % UNIVERSAL      SYSTEM
"http://server.adtech.internet.ibm.com/dtd/universal.dtd">
<!ENTITY % SUBFRAGMENTTYPES   SYSTEM
"http://server.adtech.internet.ibm.com/dtd/subfragmenttypes.txt">
<!ELEMENT PRODUCTPAGE     (SYSTEM,
                           TITLE,
                           SOURCE?,
                           COMMENT?,
                           SHORTDESCRIPTION?,
                           LONGDESCRIPTION?,
                           KEYWORD*,
                           CATEGORY*,
                           RELATEDLINK*,
                           SPECIAL)>
%UNIVERSAL;
<!ELEMENT SPECIAL         (PUBLISHINFO+,
                           BRANDNAVIGATION,
                           MAINPHOTO,
                           GLANCE,
                           HIGHLIGHTS,
                           GROUPINDEX*,
                             VIDEO*
                             ANIMATION*,
                           DISCUSSION*)>
<!ELEMENT PUBLISHINFO     (STYLESHEET, PULISHDIR, PUBLISHFILENAME)>
<!ELEMENT SYTLESHEET      (#PCDATA)>
<!ELEMENT PUBLISHDIR      (#PCDATA)>
<!ELEMENT PUBLISHFILENAME (#PCDATA)>
<!ELEMENT BRANDNAVIGATION (#PCDATA)>
<!ELEMENT MAINPHOTO       (#PCDATA)>
<!ELEMENT GLANCE          (#PCDATA)>
<!ELEMENT HIGHLIGHTS      (#PCDATA)>
<!ELEMENT GROUPINDEX      (#PCDATA)>
<!ELEMENT VIDEO           (#PCDATA)>
<!ELEMENT ANIMATION       (#PCDATA)>
<!ELEMENT DISCUSSION      (#PCDATA)>

<!-- attributes for above elements -->
<!ATTLIST PAGETYPE         NAME     (FRAGMENT|SERVABLE)  #FIXED "SERVABLE">
<!ATTLIST BRANDNAVIGATION  DATATYPE (%UITYPES;)          #FIXED "STRING">
<!ATTLIST MAINPHOTO        DATATYPE (%UITYPES;)          #FIXED "STRING">
<!ATTLIST GLANCE           DATATYPE (%UITYPES;)          #FIXED "STRING">
<!ATTLIST HIGHLIGHTS       DATATYPE (%UITYPES;)          #FIXED "STRING">
<!ATTLIST STYLESHEET       DATATYPE (%UITYPES;)          #FIXED "CHOICE"
                           CHOICES  (web_productpage.xsl |
web_productpage_debug.xsl | pda_productpage.xsl)
                                    #IMPLIED>
<!ATTLIST PUBLISHDIR       DATATYPE (%UITYPES;)          #FIXED "BROWSESERVER">
<!ATTLIST PULBISHFILENAME  DATATYPE (%UITYPES;)          #FIXED "STRING">
<!ATTLIST GROUPINDEX       DATATYPE (%UITYPES;)          #FIXED "STRING">
```

48

ELECTRIC PUBLISHING SYSTEM AND METHOD OF OPERATION GENERATING WEB PAGES PERSONALIZED TO A USER'S OPTIMUM LEARNING MODE

BACKGROUND OF INVENTION

1. Field of Invention

This invention relates to electronic publishing systems and methods of operation. More particularly, the invention relates to an electronic publishing system and method of operation for generating web pages personalized to a user's optimum learning mode.

2. Description of Prior Art

A problem in the worldwide web is the presentation of information to users to maximize the viewer's absorption of the information. Howard Gardner has proposed in his publication "Frames of Mind: The Theory of Multiple Intelligence", Basic Books, 1983 that there are seven distinct types of intelligence that a user may possess. These intelligences include visual/spatial, logical/mathematical, linguistic/verbal, interpersonal, intrapersonal, kinesthetic/body, musical/rhythmic. Viewer absorption of information would be maximized if correlated to the viewer's intelligence(s). Dr. Charles B. Shearer of Kent State University, Kent Ohio has proposed a self-reflective profile tool "Multiple Intelligence Developmental Assessment Scales (Midas)" as a basis of inferring a person's more dominant intelligence and less dominant intelligence, as based on Howard Gardner's Multiple Intelligence Theory. Implementing the theories of Gardner and Shearer in the generation of web pages should enhance the value of the web to users.

Prior art related to generating web pages includes the following:

U.S. Pat. No. 5,621,875 entitled "Method and System for Automatic Formatting of User Selected Text", issued Apr. 15, 1997, discloses a method and system for automatic formatting of user selected text in a word processing system. A number of format options are displayed to the user in a text format selection is then obtained from the user for a selected format option. An identifier identifying the selected text format is stored in text format data structure. The user thereafter selects one or more portions of existing text. For each selected portion of existing text, the selected portion is formatted with the text format identified by the identifier stored in the data structure. These steps are repeated until canceled by the user or until the user enters a new text.

U.S. Pat. No. 5,860,073 entitled "Style Sheets for Publishing System" issued Jan. 12, 1999 discloses the use of style sheets in an electronic publishing system. A style sheet is a collection of formatting information, such as font and tabs in a textual document. The style sheets are applied to individual display regions (controls) on a page. The display regions do not contain any text at the time the style sheet is applied. Rather, the text or other media, such as graphics is poured into the display region when the title is rendered on the customer's computer.

U.S. Pat. No. 5,899,975 entitled "Style Sheets for Speech-Based Representation of Web Pages", issued May 4, 1999, discloses the presentation of audio information, particularly audio information generated by a voice synthesizer from text using a text or screen reader as controlled using a style sheet. The style sheet permits default presentation styles, such as voice-family, voice-pitch, voice-variant, voice speed and volume to be set, and then varied based on embedded text presentation commands such as those found in hypertext markup language and in desktop publishing.

U.S. Pat. No. 6,023,714 entitled "Method & System for Dynamically Adapting the Layout of a Document to an Output Device", issued Feb. 8, 2000, discloses dynamically adapting a layout of a document to a particular output device. The layout of a document can be adapted to a particular output device so that the document fully utilizes the capability of the output device. The layout generator interrogates the output device to determine the capabilities of the output device. Based upon the capabilities of the output device, the layout generator selects a style sheet to accommodate the particular output device. The style sheet assigns values to format properties such as font properties, color and background properties, and text properties. The layout of the document is adapted to a particular output device by rendering the document on the output device using the values supplied in the style sheet.

None of the prior art solves the problem of adapting web pages to a user's optimum mode of learning based on the theories of Gardner and Shearer.

SUMMARY OF THE INVENTION

An object of the invention is a system and method, which enhances the transfer of information from a web page to a user, based on the user's optimum learning mode.

Another object is a system and method for identifying a user's optimum learning mode for receiving information from a web page.

Another object is a system and method for incorporating cognitive learning theories into document templates for displaying information on a web page.

Another object is a system and method for generating templates to display information in a web page to a user based on the user's optimum learning mode.

Another object is a system and method for generating style sheets and displaying information in templates based on a user's optimum learning mode.

These and other objects, features and advantages are achieved in an electronic publishing system (EPS) including a processor, a memory, a disk operating system, and an I/O device coupled to a distributed information network, e.g., the Internet, and serving a plurality of users. The memory includes stored instructions for an operating system; a web page generator; an optimum learning mode questionnaire and processing; a session tracking routine, and a user identification file. The disk operating system includes program instructions for generating Extensible Style Sheet Language (XSL) and Extensible Markup Language (XML) files; image files; Hypertext Markup Language (HTML) files; a Document-type Definition (DTD) syntax file and profiles of users coupled to the network and describing a user's optimum learning mode. In operation, a user explicitly selects a learning profile or the system implicitly calculates a profile for viewing a web page conducive to the user's optimum mode of learning based on the theory of multiple intelligences. An algorithm calculates the user's profile. The profile is encoded as a vector of weights for each of the seven modes of learning. Alternatively, the user answers a questionnaire provided by the EPS to determine the user's optimum mode of learning. The questionnaire elicits answers used to calculate the user's optimum learning mode. The user profiles are stored on the disk for subsequent use when web pages are presented to the user. A document template is created and defines the structure of information to be presented on a web site. The document templates are created with Document Type Definition (DTD) syntax. Style sheets are created that determine the presentation layout of the information for each user profile. The learning theories are translated into layout rules for the template. An Extensible Style Sheet Language (XSL) is used to define the style sheet. The XSL style sheet is combined with Extensible Markup Language (XML) files to produce Hypertext Markup Language (HTML) files to be viewed by the user. Authors and editors create content for the web site. Authors abiding by the predefined document templates create the content. The authors encode the content in a format that is independent of the final presentation or layout. The content is encoded in XML. The system generates HTML files corresponding to the different modes of learning using the style sheets and the content previously generated. The HTML files are saved in the system or generated on the fly when an end user accesses the web site. A process, the IBM XMLEnabler, is used to generate the HTML output from the XML content and the XSL style sheet. The XMLEnabler is a server-side technology that combines XML files with XSL style sheets to create the HTML. A web server provides the appropriate HTML page upon a user's request for a page based on a profile. If HTML pages are pre-generated into the file, a page is accessed from the disk. Otherwise, the HTML files are generated upon a user's request. The user's profile is obtained by decoding either an HTTP cookie or information within the URL string. If the profile is encoded directly in a cookie or URL, the profile is forwarded to the server. If the profile has been saved in database, the cookie or the URL contain a unique user ID that is used to obtain the profile on the server from disk or a database. The profile determines which version of the page to send to the user in accordance with the user's optimum learning mode.

DESCRIPTION OF THE DRAWING

The invention will be further understood from the following detailed description of a preferred embodiment taken in conjunction with an appended drawing, in which:

FIG. 1 is a representation of a system for generating web pages personalized to a user's optimum learning mode and incorporating the principles of the present invention.

FIGS. 2A and B are representations of multiple intelligence's profiles used in the system of FIG. 1.

FIG. 3 is a representation of a DTD template for describing information as an XML file and producing an HTML web page.

DESCRIPTION OF PREFERRED EMBODIMENT

Figure 4:
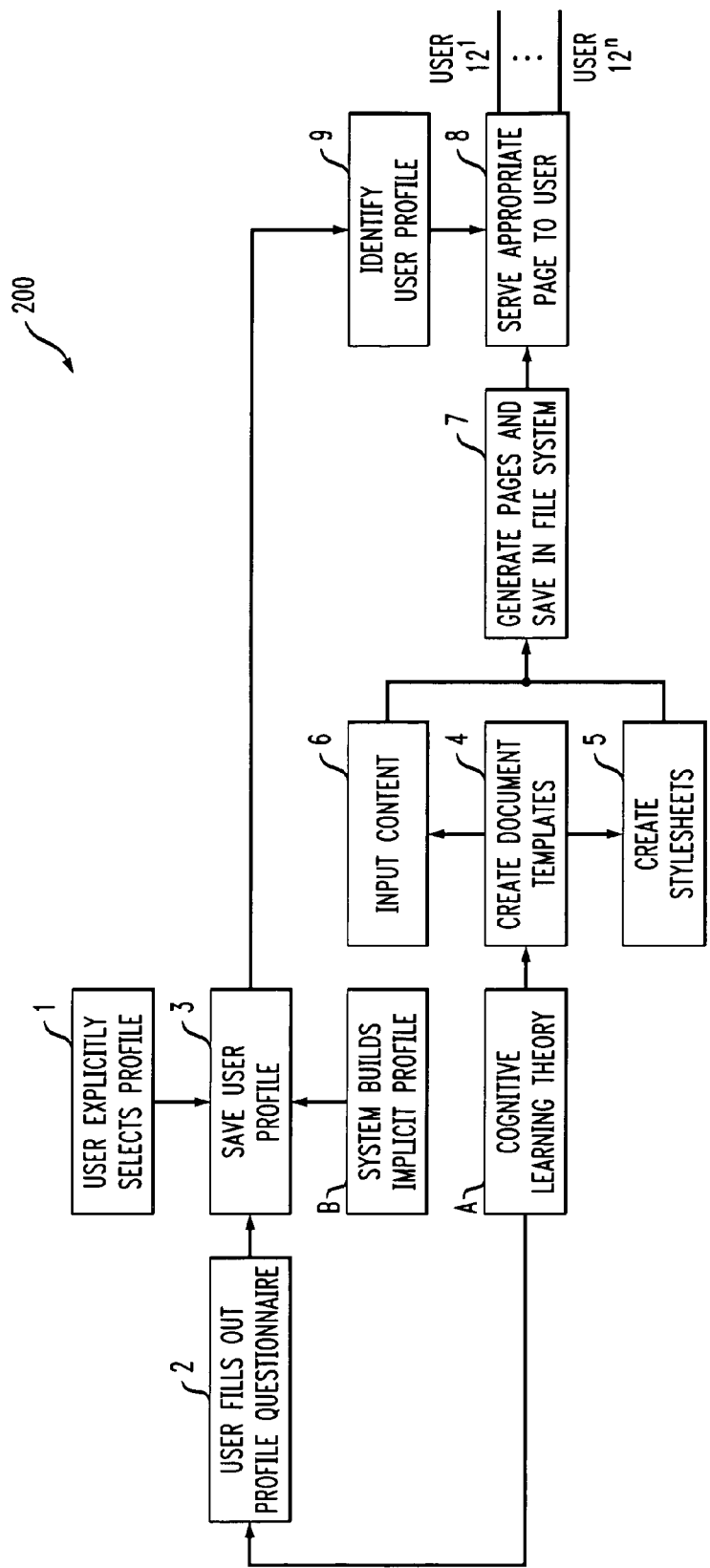
FIG. 4 is a flow diagram for implementing the generation of web pages personalized to a user's optimum learning mode implemented in the system of FIG. 1.

FIG. 1 shows an illustrative data processing system 10 adapted for electronic publishing of information, typically web pages for the Internet. The system 10 implements a process to be described in FIG. 4 for presenting information to a user at a web site, or other information portal, in a way that is conducive to his/her Optimum Mode of Learning (OML). OML is defined as the manner in which a person most successfully acquires new knowledge based on their prominent mode of learning under the theories of multiple intelligences.

In FIG. 1, the system 10 serves as a web site for serving a plurality of users $12^1, \ldots 12^N$, in a distributed information network 13. The web site includes a processor 14 coupled to or incorporating a memory 17 containing stored program instructions 18. The processor is coupled through a bus 19 to a disk operating system 23 containing stored program instruction 24 and an I/O terminal 25 for interacting with the users in accordance with instructions provided by the processor 14.

The stored instructions 18 include operating system 30 for controlling the memory, disk and I/O. A page generator 32 creates web pages for display to and interaction with the users $12^1, \ldots 12^N$. A questionnaire processing function 34 is used by the process in determining the optimum learning mode of a user. A session tracking function 36 implements hypertext transaction protocols enabling a user to interact with the web site. A user identification function identifies the user coming to the web site through the distributed information network (13). A XMLEnabler 39, available from IBM, Armonk, N.Y. is used to generate the HTML output from the XML content and the XSL style sheets, as will be described hereinafter.

The stored program instructions 24 include style sheets 40 implemented in the Extensible Style Sheet Language (XSL) for specifying the presentation of a document implemented in the Extensible Markup Language (XML). The documents implemented as XML files are stored in files 42. Multimedia files (images, audio, video, etc.) 44 contain resources of objects to be incorporated into the generated HTML files. HTML files 46 contain different presentations of information targeted at each of the users. A Document Type Definition (DTD) file 48 is used to create document templates for presenting information to a user. A user profile file 50 contains profiles of the users indicating the optimum learning mode of the user. Before describing a process to build a web page according to a user's OML, a brief description will be provided of the composition of a profile selected by or acquired from a user in representing his/her OML. Also, a template will be used as a description of the content to be modified by a stylesheet for subsequent presentation to a user as a web page.

In FIG. 2A, a user profile 50 is calculated from a questionnaire, presented as an electronic form and answered by the user, to elicit his/her optimum mode of learning.

Alternatively, in FIG. 2B, the profile is determined by the user selecting a choice on a web page. The learning modes and their abbreviated description are set forth in columns 1 and 2 of the profile. Column 3 provides a rating number between 0.0 and 1.0 for each learning mode for a user, related to a user's anticipated optimum learning mode for the skill. The rating is normalized so all values add up to 1.0.

An algorithm is used for determining profile weights from a questionnaire. The goal of this algorithm is to produce a normalized list of weights, as shown in FIG. 2A.

For each mode of learning, a question has a base weight. In addition, for each mode of learning, a question has three additional types of weights. Explicit weights, used when a question is answered directly; an implicit weight, used when a previous question implies the answer of a subsequent one; and associative weight, used when grouping questions with similar ones. Weights for example questions:

|  | Interpersonal | | | | Intrapersonal | | | |
|---|---|---|---|---|---|---|---|---|
| Weights | Base | Explicit | Implicit | Associative | Base | Explicit | Implicit | Associative |
| Q1 | 3 | 3 | 2 | 1 | 0 | 1 | 1 | 1 |
| Q2 | 0 | 1 | 1 | 1 | 10 | 3 | 2 | 1 |
| Q3 | 0 | 3 | 2 | 3 | 10 | 2 | 2 | 1 |

In this example for Q1, the base weight is 3 for interpersonal and 0 for intrapersonal. For Q2 the base weight is 0 for interpersonal and 10 for intrapersonal. Once these weights have been defined, a score for the answers can be determined for each mode of learning. The simplest method is to multiply the base value of the question times the explicit weight (Base*Explicit). These are summed over all questions for a given mode of learning. When all seven scores have been calculated, a normalized vector of values can be created.

A variation on this algorithm is to calculate a question's value based on its implicit or associative weight instead of the explicit weight. This can be done when a previous question implies the answer of a subsequent question.

Steps to calculate the profile via a questionnaire:
1. Determine list of questions to ask.
2. Provide base weights for each question for each mode of learning.
3. Provide weights for additional types (explicit, implicit and associative) for each question for each mode of learning.
4. Allow user to fill out questionnaire.
5. Calculate the value of each question based either on explicit, implicit or associative weights.
6. Sum the question values for each mode of learning.
7. Normalize these sums and create a vector of weights that will become the profile for the user.

FIG. 2B is another profile generated as the result of a user selecting a specific mode of learning, in this the fourth mode of learning. As will be described hereinafter, the profiles are used to select which page is presented to a user in his or her optimum learning mode.

In FIG. 3, a typical XML page is prepared using a DTD as a template 48 for content prepared by an author. The first two lines show additional DTD definitions that are used to complete the definition of this PRODUCTPAGE. Lines 3–12 show elements that describe basic properties of a page in our system. Lines 14–22 then show elements particular to the PRODUCTPAGE DTD. Lines 37–47 show the attributes of the elements of this DTD. Different style sheets will use the same content, which conforms to the template 48, but will use different information components within the template. For example, visual/spatial learning mode might use the video and main photo content in prominent locations on the page, where linguistic/verbal learning mode might use the long description instead.

In FIG. 4, a process 200 builds a user profile, constructed explicitly or implicitly, and stores the user's OML. In addition, the process creates content templates and style sheets that define the structure of the information to be presented in the user's optimum mode of learning. Based on the profile of the user requesting information, the system 10 determines the most appropriate information presentation. The goal is to improve a user's absorption of information at a web site.

The process is entered in step 1 in which a user explicitly selects a profile (See FIG. 2B) using a mouse, clicking on a profile from a list of profiles displayed on a web page. The web page displays options of predetermined profiles with which to view information. These options are presented to new users or those who don't have a profile on record. At any time, the user can return to step 1 to change their current profile. The profile is encoded as a vector of weights, where each weight corresponds to the importance of a mode of learning taken from the Gardner list of multiple intelligences. For example, in an implementation, a vector of weights for the seven Gardner modes of learning options might be (1.0, 0.0, 0.0, 0.0, 0.0, 0.0, 0.0). The weight 1.0 would indicate that the first element in the list of multiple intelligences, i.e., visual/spatial, would be the preferred mode of learning. Spatial intelligence is the ability to "think in pictures", perceive the visual world accurately and recreate (or alter) in the mind or on paper. Spatial intelligence is highly developed in artists, architects, designers and sculptors. In another implementation, a profile may have several weights, which the system has calculated for the user (FIG. 2A).

Alternatively, in step 2, the user completes a questionnaire provided by the instructions 34 (see FIG. 1) and displayed on the web page. The questionnaire includes questions informed by Module A (to be described hereinafter) according to a cognitive learning theory, i.e. Gardner or others. The questionnaire elicits answers used to calculate a user's OML. Depending on the answers, each question contributes a weight to one of the profile options. For example, in one implementation, a final normalized vector of weights for seven profile options might be (0.1, 0.0, 0.0, 0.1, 0.1, 0.2, 0.5) which indicates that the user has learning abilities in a number of different modes. For another user, a different set of weights would indicate another profile applicable to that user. In any case, the framework or concrete set of questions provided by the Module A identifies the most prominent mode of learning for an individual as categorized by the Gardner Theory of Multiple Intelligences.

In step 3, the information from Steps 1 and 2 provides a weighted vector representing the user's OML. This module saves this profile to the file system or database. Alternatively, in external module B, the profile can be determined using a range of information collected about the user. For example, algorithms can use implicit or collaborative information about the user. Implicit information is data from which a person's OML can be deduced. For example, faced with two options, both resulting in access to information of equal quality, but presented differently, the user's decision to choose one over the other is an implicit indication of how the user prefers to interact with information. By tracking the user's actions, the algorithm can build an OML profile. Another example of implicit information is an existing profile that describes the user's role within an organization or interest. An algorithm can make the mapping between such existing profiles and an OML profile.

Collaborative information uses information about the OML's of a group of individuals to deduce an individual OML. Collaborative information can be used to determine a person's OML when limited or no explicit or implicit information is available.

The user profile is saved in permanent storage, such as a database or the hard disk so that returning users do not have to create a profile at every session. The profile can also be saved locally for a browser as an HTTP cookie, so that the profile persists across several sessions. In another embodiment, the profile can be sent as part of the Uniform Resource Locator (URL) for a web site and thus be maintained across web pages.

In step 4 a domain expert manually creates document templates (See FIG. 3) that define the structure of the information to be presented on the web site. Each document template corresponds to a logical entity of information on the particular subject matter. For example, a document template would specify all necessary fields required by a news article or product specification. The creation of the document templates is a one-time task. The document templates are created with the industry standard Document Type Definition (DTD) syntax and stored in the DTD files 48 (see FIG. 1). XML conforms to these DTDs and is the universal format for structured documents and data on the web.

In step 5, a designer manually creates style sheets that determine the presentation and layout of the information for each document template and for each mode of learning. A designer should have a good knowledge of the particular learning theory used by the system and how the theory is defined in the way an individual with a sensitivity to a particular learning mode best absorbs new information. The designer translates that knowledge into layout rules. The rules are encoded into style sheets for each document template. An Extensible Style Sheet Language (XSL) defines the style sheets. XSL is a standard from the World Wide Web Consortium and is described at http://www.w3.org/Style/XSL. The XSL style sheets specifies the presentation of a class of XML documents (see Step 4) by describing how an instance of the class is transformed into an HTML document.

In step 6, authors and editors create content for the web site. Using standard authoring tools or text editors, the authors and editors create the content to be presented to the users of the web site. The authors create the content by abiding to the predefined document templates provided in Step 4. The authors encode the content in a format independent of the final presentation or layout. In an illustrative implementation, the content is encoded in Extensible Markup Language (XML).

In step 7, the system generates Hypertext Markup Language (HTML) files according to the different modes of learning for the users using the style sheets from Step 5 and the XML content from Step 6. In the current embodiment, the system chooses the optimum mode of learning based on the highest value in the user's profile. This mode of learning is used to select the appropriate HTML page to present to the user. If there is a tie in the profile scores, the first occurrence in the profile vector will be used. The modes of learning are ordered in the profile by order of preference for presentation to the user. HTML is an application of ISO Standard 8879. Each style sheet from Step 5 is used to produce a different version of an encoded HTML file. The different presentations are served as HTML files 46 stored on the disk 24. Alternatively, the HTML files are generated on the fly when the end user accesses the web server. The XMLEnabler 39 (See FIG. 1) is a server-side technology that combines XML files with XSL style sheets and creates the HTML.

In step 8, user requests a web page using a web browser. If the HTML pages are pregenerated in Step 7, Step 8 requires access to the HTML file 46. If the HTML pages are generated upon user request, Step 8 invokes the HTML generation in Step 7 by pointing to the appropriate style sheet. The server serves the HTML page to the user's browser.

In Step 9, a user's profile is obtained from user profile file 50, stored on the disk 23 (See FIG. 1) which defines his/her best learning mode. An HTTP cookie or URL contains the encoded profile identifier or user name. The user's profile is obtained by decoding the HTTP cookie or the URL string. If the profile is encoded directly in the cookie or URL, the profile is forwarded to Step 8. If the profile has been saved in the database, Step 9 retrieves the user profile and forwards it to Step 8. The HTML page is displayed to the user according to the user's OML.

Summarizing, an electronic publishing system and method of operation calculates a user's optimum learning mode from learning profiles selected by the user or completing a questionnaire which elicits answers used to calculate the user's optimum mode of learning. Each profile is encoded as a vector of weights for the seven modes of multiple intelligences described by Gardner. Information to be provided to the user is created by authors and editors and presented in a document template in accordance with a style sheet prepared using XSL. The XSL style sheet is combined with the XML content to produce a final HTML output viewed by the user when a user requests a web page from a browser using an HTTP cookie or URL containing the user's profile. By decoding the HTTP cookie or URL string, the HTML file is presented to the user in accordance with the user's profile, in a manner which optimizes the user's mode of learning.

While the invention has been shown and described in conjunction with a preferred embodiment, various changes can be made without departing from the spirit and scope of the invention, as defined in the appended claims, in which:

We claim:

1. An electronic publishing system for generating personalized web pages according to a user's optimum mode of learning, comprising:
 a computer system coupled to a plurality of users through a network;
 means for generating and storing a plurality of profiles, wherein a profile for a user is generated from a questionnaire answered by the user, the questionnaire comprising a plurality of questions, wherein an answer provided by the user to each question results in a designation of a series of weights to one or more of a plurality of learning modes, wherein the series of weights comprise a base weight, an explicit weight, an implicit weight and an associative weight which are utilized to generate a plurality of normalized numeric learning mode ratings in the profile, and wherein a highest numeric learning mode rating in the profile corresponds to an optimum learning mode for the profile;
 means for creating document templates displaying a structure of information to be presented on a web site serving the users;
 means for creating style sheets determining a presentation of each document template for each learning mode;
 means for creating content for the web site in accordance with the document templates;

means for generating HTML files for each learning mode using the style sheets for each learning mode and the content; and means for presenting an HTML file to a user corresponding to an optimum learning mode for a profile of the user.

2. The system of claim 1 wherein the document templates are created with a Document Type Definition (DTD) syntax.

3. The system of claim 1 wherein the style sheets are created using an Extensible Style Sheet Language (XSL).

4. The system of claim 1 wherein the content is created using an Extensible Mark-Up Language (XML).

5. The system of claim 1 further comprising means for calculating a user profile as a vector of weights.

6. In an electronic publishing system including a computer system coupled to a plurality of users in a distributed information network, a method of generating personalized web pages according to a user's optimum mode of learning, comprising the steps of:

creating a user profile, wherein the user profile is generated from a questionnaire answered by the user, the questionnaire comprising a plurality of questions, wherein an answer provided by the user to each question results in a designation of a series of weights to one or more of a plurality of learning modes, wherein the series of weights comprise a base weight an explicit weight, an implicit weight and an associative weight which are utilized to generate a plurality of normalized numeric learning mode ratings in the profile, and wherein a highest numeric learning mode rating in the user profile corresponds to an optimum mode of learning for the user profile;

creating document templates displaying a structure of information to be presented using a syntax;

creating content in a language in accordance with the document templates;

creating style sheets determining a presentation of each document template for each learning mode;

combining the content file with the style sheets to generate web files for each of the different modes of learning; and providing a web page to a user that matches the user's optimum mode of learning based upon the user's profile.

7. The method of claim 6 further comprising the step of: calculating a user profile as a vector of weights.

8. The method of claim 6 further comprising the step of: providing information defined by the style sheets and user profile in an HTML file based upon a HTTP cookie or URL string with an encoded profile identifier or user name.

9. An article of manufacture:

a program medium for generating personalized web pages according to a user's optimum mode of learning, comprising:

program instruction means in the medium for generating and storing a plurality of profiles, wherein a profile for a user is generated from a questionnaire answered by the user, the questionnaire comprising a plurality of questions, wherein an answer provided by the user to each question results in a designation of a series of weights to one or more of a plurality of learning modes, and wherein the series of weights comprise a base weight, an explicit weight an implicit weight and an associative weight which are utilized to generate a plurality of normalized numeric learning mode ratings in the profile, and wherein a highest numeric learning mode rating in the profile corresponds to an optimum learning mode for the profile;

program instruction means in the medium means for creating document templates displaying a structure of information to be presented on a web site serving the users; and program instruction means in the medium for creating style sheets determining a presentation of each document template for each learning mode; and program instruction means in the medium for providing information defined by the style sheets and user profile in an HTML file based upon a HTTP cookie or URL string with an encoded profile identifier or user name.

10. The article of manufacture of claim 9 further comprising:

program instruction means in the medium for calculating a user profile as a vector of weights.

11. A method of personalizing a web page, comprising the steps of:

storing one or more user profiles on a disk, wherein a profile for a user is generated from a questionnaire answered by the user, the questionnaire comprising a plurality of questions, wherein an answer provided by the user to each question results in a designation of a series of weights to one or more of a plurality of learning modes, wherein the series of weights comprise a base weight, an explicit weight, an implicit weight and an associative weight which are utilized to generate a plurality of normalized numeric learning mode ratings in the profile, and wherein a highest numeric learning mode rating in the user profile corresponds to an optimum mode of learning for the user profile;

creating document templates displaying a structure of information to be presented;

creating style sheets determining a presentation of each document template for each learning mode;

creating content in accordance with the document templates;

generating one or more web files for each learning mode using the style sheets for each learning mode and the content; and displaying a web page to a user based on the one or more web files and the optimum mode of learning in the user's profile.

* * * * *

UNITED STATES PATENT AND TRADEMARK OFFICE
CERTIFICATE OF CORRECTION

PATENT NO. : 6,996,768 B1
DATED : February 7, 2006
INVENTOR(S) : S. Elo et al.

It is certified that error appears in the above-identified patent and that said Letters Patent is hereby corrected as shown below:

<u>Title page,</u>
Item [54], Title, should read:
-- ELECTRONIC PUBLISHING SYSTEM AND METHOD OF OPERATION GENERATING WEB PAGES PERSONALIZED TO A USER'S OPTIMUM LEARNING MODE --.

<u>Column 10,</u>
Line 6, delete "and".
Line 7, delete "explicit weight" and insert -- explicit weight, --.

Signed and Sealed this

Eighteenth Day of April, 2006

JON W. DUDAS
*Director of the United States Patent and Trademark Office*